United States Patent
Mikamo

(10) Patent No.: US 9,821,839 B2
(45) Date of Patent: Nov. 21, 2017

(54) ROTATION DETECTION APPARATUS, ROTATION ANGLE DETECTION APPARATUS, AND ELECTRIC POWER STEERING SYSTEM

(71) Applicant: JTEKT CORPORATION, Osaka-shi, Osaka (JP)

(72) Inventor: Satoru Mikamo, Okazaki (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 15/083,920

(22) Filed: Mar. 29, 2016

(65) Prior Publication Data

US 2016/0288823 A1 Oct. 6, 2016

(30) Foreign Application Priority Data

Mar. 31, 2015 (JP) ................................ 2015-073246

(51) Int. Cl.

| | |
|---|---|
| *A01B 69/00* | (2006.01) |
| *B62D 6/00* | (2006.01) |
| *B62D 11/00* | (2006.01) |
| *B62D 12/00* | (2006.01) |
| *B63G 8/20* | (2006.01) |
| *B63H 25/04* | (2006.01) |
| *G06F 7/00* | (2006.01) |
| *G06F 17/00* | (2006.01) |
| *G06F 19/00* | (2011.01) |
| *B62D 5/04* | (2006.01) |
| *G01D 5/14* | (2006.01) |

(Continued)

(52) U.S. Cl.

CPC ............ *B62D 5/049* (2013.01); *B62D 5/0463* (2013.01); *B62D 15/021* (2013.01); *G01D 5/145* (2013.01); *G01D 5/16* (2013.01); *G01D 5/24461* (2013.01); *G01L 5/221* (2013.01)

(58) Field of Classification Search

CPC .... B62D 5/0463; B62D 15/021; G01D 5/145; G01D 5/16; G01D 5/24461; G01L 5/221

USPC .......................................................... 701/41

See application file for complete search history.

(56) References Cited

U.S. PATENT DOCUMENTS

2002/0067160 A1    6/2002  Oomkes

FOREIGN PATENT DOCUMENTS

| JP | 2011-095094 A | 5/2011 |
|---|---|---|
| JP | 2014-234072 A | 12/2014 |
| WO | 2014/180611 A1 | 11/2014 |

OTHER PUBLICATIONS

Jun. 28, 2016 Search Report issued in European Patent Application No. 16162600.7.

*Primary Examiner* — Maceeh Anwari

(74) *Attorney, Agent, or Firm* — Oliff PLC

(57) ABSTRACT

A rotation detection apparatus, a rotation angle detection apparatus are provided which allow appropriate detection of an abnormality in a portion that detects rotation of a rotating shaft. A first arithmetic circuit calculates a rotating direction and a number of rotations of the rotating shaft based on a change in a combination of positivity and negativity of a first electric signal (first sine signal) and a third electric signal (first cosine signal). A second arithmetic circuit calculates a rotating direction and a number of rotations of the rotating shaft based on a change in a combination of positivity and negativity of a second electric signal (second sine signal) and a fourth electric signal (second cosine signal). An abnormality determination circuit determines whether each of the first and second arithmetic circuits and is abnormal (Continued)

based on the two rotating directions and calculated by the first and second arithmetic circuits respectively.

5 Claims, 5 Drawing Sheets

(51) Int. Cl.
*G01D 5/244* (2006.01)
*G01D 5/16* (2006.01)
*G01L 5/22* (2006.01)
*B62D 15/02* (2006.01)

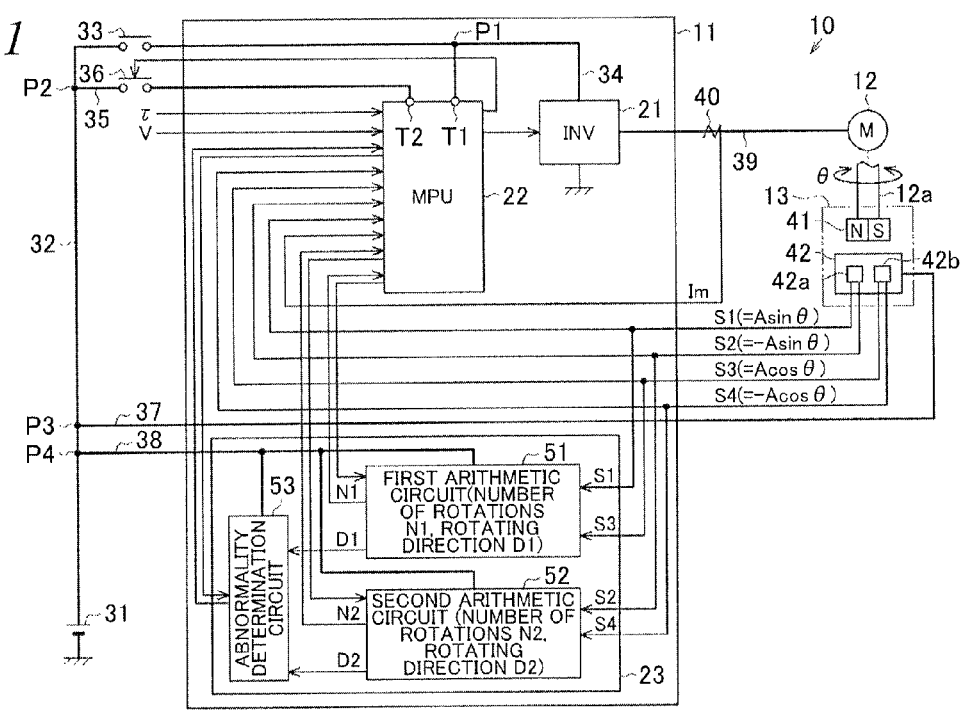

TYPE 1

TYPE 2

TYPE 3

TYPE 4

TYPE 5

TYPE 6

FIG. 3

| | TIME | | CALCULATION RESULT PRODUCED BY FIRST ARITHMETIC CIRCUIT 51 (D1) | CALCULATION RESULT PRODUCED BY SECOND ARITHMETIC CIRCUIT 52 (D2) | DIFFERENCE IN QUADRANT | DETERMINATION RESULT | TYPE |
|---|---|---|---|---|---|---|---|
| A | ↓ | t1 | FORWARD | – | +1 | – | 2~5 |
| | | t2 | FORWARD | FORWARD | +1 | – | 6 |
| | | t3 | BACKWARD | BACKWARD | +1 | – | 6 |
| | | ⋮ | ⋮ | ⋮ | ⋮ | ⋮ | |
| | | tn | FORWARD | – | +2 | ABNORMAL | 2 |
| B | | tn | BACKWARD | – | 0 | NORMAL | 4 |
| C | | tn | – | BACKWARD | +2 | ABNORMAL | 3 |
| D | | tn | – | FORWARD | 0 | NORMAL | 5 |
| E | | tn | FORWARD | FORWARD | +2 | ABNORMAL | 1 |

ROTATION DETECTION APPARATUS, ROTATION ANGLE DETECTION APPARATUS, AND ELECTRIC POWER STEERING SYSTEM

INCORPORATION BY REFERENCE

The disclosure of Japanese Patent Application No. 2015-073246 filed on Mar. 31, 2015 including the specification, drawings and abstract, is incorporated herein by reference in its entirety.

BACKGROUND OF THE INVENTION

1. Field of the Invention

The invention relates to a rotation detection apparatus, a rotation angle detection apparatus, and an electric power steering system.

2. Description of the Related Art

Electric power steering systems (hereinafter referred to as EPSs) have been known which generate an assist torque using a motor as described in, for example, Japanese Patent Application Publication No. 2011-095094 (JP 2011-095094 A). A control apparatus in the EPS controls a torque to be generated by a motor in accordance with a steering torque detected through a torque sensor. The control apparatus conducts a current through a coil of the motor in accordance with a rotation angle of the motor detected through a rotation angle sensor.

EPSs are also available which perform compensation control on a basic target assist torque based on the steering torque in order to provide more excellent steering feeling. The compensation control includes steering return control that returns a steering wheel to a neutral position based on a steering angle of the steering wheel. The control apparatus in the EPS determines the steering angle by calculating a rotation angle of the steering shaft, for example, based on the rotation angle of the motor.

As described in JP 2011-095094 A, rotation angle sensors are known which include a magnetic sensor. Some such magnetic sensors each have two detectors. A first detector generates a sine signal that varies like a sine wave according to the rotation angle of a rotating shaft of the motor. A second detector generates a cosine signal that varies like a cosine wave according to the rotation angle of the rotating shaft of the motor. The control apparatus in the EPS calculates arctangent values for the sine signal and the cosine signal to determine the rotation angle of the rotating shaft.

In this case, the rotation angle detected through the rotation angle sensor is a relative angle varying within the range from 0° to 360°. In contrast, the steering angle, used for steering return control and the like, is an absolute angle varying beyond the range from 0° to 360°. Thus, with the rotation angle sensor in use, the steering angle needs to be detected in absolute value. The control apparatus in the EPS, for example, counts the number of rotations corresponding to the number of changes, during one period (360°), in the rotation angle (electrical angle) detected by the rotation angle sensor, and calculates the steering angle in absolute value based on the counted number of rotations and the rotation angle detected through the rotation angle sensor.

EPSs are available which power down the control apparatus and the rotation angle sensor when a power switch of a vehicle is turned off. In such an EPS, the rotation angle of the motor cannot be detected while the power switch is off. In this situation, when the steering shaft is rotated through operation of the steering wheel, the count value of the number of rotations is different from the actual value of the number of rotations. In this case, when the power switch of the vehicle is turned on again, the absolute value of the steering angle may fail to be appropriately detected.

To eliminate such concern, for example, Japanese Patent Application Publication No. 2014-234072 (JP 2014-234072A) adopts the following configuration. That is, the control apparatus in the EPS is provided with a control apparatus that controls driving of the motor and an arithmetic, circuit that calculates the rotation angle of the motor; the control apparatus and the arithmetic circuit are independent of each other. When the power switch on the vehicle is turned off, power from an in-vehicle battery or a battery provided separately from the in-vehicle battery is supplied to the rotation angle sensor and to the arithmetic circuit. The arithmetic circuit continues to calculate the rotation angle of the motor even while the power switch is off.

The EPS needs to have high reliability, and this also applies to the arithmetic circuit, which is a component of the EPS. For example, if the arithmetic circuit incorrectly calculates the rotation angle of the motor, driving of the motor is controlled based on the incorrect rotation angle. Thus, generating an appropriate assist torque may be difficult. Therefore, an abnormality in the arithmetic circuit needs to be appropriately detected.

SUMMARY OF THE INVENTION

An object of the invention is to provide a rotation detection apparatus, a rotation angle detection apparatus, and an electric power steering apparatus that allow appropriate detection of an abnormality in a functional portion detecting rotation of a rotating shaft.

An aspect of the invention provides a rotation detection apparatus that detects a rotating direction of a rotating shaft and a number of rotations of the rotating shaft based on first and second sine signals and first and second cosine signals generated by a sensor connected to the rotation detection apparatus, the first and second sine signals being in accordance with rotation of the rotating shaft and having phases shifted from each other by 180°, the first and second cosine signals being in accordance with rotation of the rotating shaft and having phases shifted from each other by 180°.

The rotation detection apparatus includes:
 a first arithmetic circuit that calculates the rotating direction of the rotating shaft and the number of rotations of the rotating shaft based on a change in a combination of positivity and negativity of values for the first sine signal and the first cosine signal,
 a second arithmetic circuit that calculates the rotating direction of the rotating shaft and the number of rotations of the rotating shaft based on a change in a combination of positivity and negativity of values for the second sine signal and the second cosine signal, and
 an abnormality determination circuit that determines that an abnormality has occurred in at least one of the first and second arithmetic circuits based on the rotating direction calculated by the first arithmetic circuit and the rotating direction calculated by the second arithmetic circuit.

In this configuration, the first arithmetic circuit and the second arithmetic circuit execute the same calculation and thus produce basically the same calculation result. Thus, when the two rotating directions calculated by the first and second arithmetic circuits are in a normally impossible combination (a combination exhibiting a normally impossible change), this indicates that an abnormality has occurred in at least one of the first and second arithmetic circuits. As described above, an abnormality in the first and second arithmetic circuits can be appropriately detected based on the calculated two rotating directions.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 1 is a block diagram of an electric power steering system having a rotation detector;

FIG. 3 shows a graph A depicting in a time series manner an example of changes, in a quadrant transition direction, in two coordinates that are each a set of sin $\theta$ and cos $\theta$, and graphs B to E depicting other examples of changes in two coordinates in the quadrant transition direction.

DETAILED DESCRIPTION OF EMBODIMENTS

Figure 2A:
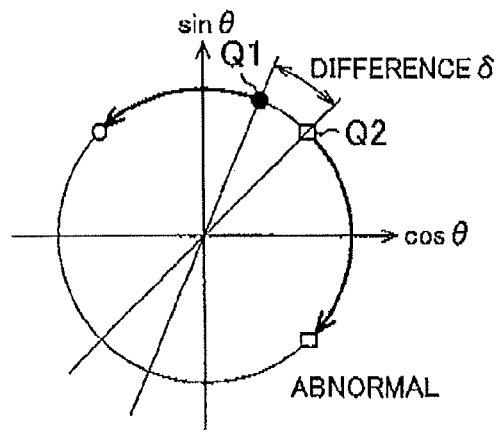
FIG. 2A shows Lissajous diagram depicting a type of changes in two coordinates that are each a set of sin $\theta$ and cos $\theta$.

An embodiment will be described in which a rotation detection apparatus of the invention is embodied as an electric power steering system (hereinafter referred to as an EPS). As depicted in FIG. 1, an EPS 1 has an electronic control unit (ECU) 11 and a motor 12. As the motor 12, for example, a three-phase brushless motor is adopted. The motor 12 is provided with a rotation angle sensor 13. The rotation angle sensor 13 generates a first electric signal S1, a second electric signal S2, a third electric signal S3, and a fourth electric signal S4 in accordance with a rotation angle $\theta$ of the motor 12 (to be exact, a rotating shaft 12a of the motor 12).

The ECU 11 detects the rotation angle $\theta$ based on the first to fourth electric signals S1 to S4 generated by the rotation angle sensor 13 to vector-control the motor 12 based on the detected rotation angle $\theta$. The ECU 11 calculates a target assist torque based on a steering torque $\tau$ and a vehicle speed V detected through in-vehicle sensors not depicted in the drawings. The ECU 11 feedback-controls a current supplied to the motor 12 to make an assist torque generated by the motor 12 equal to the target assist torque.

Now, a configuration of the ECU 11 will be described. The ECU 11 has a driving circuit (inverter circuit) 21 and an MPU (Micro Processing Unit) 22. The ECU 11 also has a rotation detector 23. The rotation detector 23 detects the number of rotations and the rotating direction of the motor 12 based on the first to fourth electric signals S1 to S4.

The driving circuit 21 and the MPU 22 are supplied with power by a DC power supply 31 such as a battery mounted in a vehicle. Various sensors including the rotation angle sensor 13 are also supplied with power by the DC power supply 31.

A power terminal T1 of the MPU 22 and the DC power supply 31 (to be exact, a positive terminal of the DC power supply 31) are connected together by a first feeding line 32, A power switch 33 for the vehicle is provided on the first feeding line 32, On the first feeding line 32, a first connection point P1 is set between the power switch 33 and the MPU 22. The first connection point P1 and the driving circuit 21 are connected together by a second feeding line 34. On the first feeding line 32, a second connection point P2, a third connection point P3, and a fourth connection point P4 are set between the DC power supply 31 and the power switch 33. The second connection point P2 and a second power supply terminal T2 of the MPU 22 are connected together by a third feeding line 35. A power relay 36 is provided on the third feeding line 35. The third connection point P3 and the rotation angle sensor 13 are connected together by a fourth feeding line 37. The fourth connection point P4 and the rotation detector 23 are connected together by a fifth feeding line 38.

Turning on the power switch 33 allows power of the DC power supply 31 to be supplied to the MPU 22 via the first feeding line 32 and to the driving circuit 21 via the second feeding line 34. Turning on the power relay 36 allows power of the DC power supply 31 to be supplied to the MPU 22 via the third feeding line 35. Power of the DC power supply 31 is constantly supplied to the rotation angle sensor 13 via the fourth feeding line 37 and to the rotation detector 23 via a fifth feeding line 38.

The driving circuit 21 is a well-known PWM inverter including three arms corresponding to three phases (U, V, and W) and connected together in parallel; each of the arms has, as a basic unit, switching elements such as two field effect transistors (FETs) connected together in series. The driving circuit 21 converts DC power supplied by the DC power supply 31 into three-phase AC power based on a motor control signal (PWM driving signal) generated by the MPU 22. The three-phase AC power is supplied to the motor 12 (to be exact, motor coils for the three phases) via respective feeding paths 39 for the three phases. Current sensors 40 are provided for the feeding paths 39 for the respective phases. The current sensors 40 detect current values Im of actual currents generated in the feeding paths 39 for the respective phases. In FIG. 1, the feeding paths 39 for the respective phases and the current sensors 40 for the respective phases are collectively illustrated as a single feeding path and a single current sensor, respectively, for convenience of description.

The MPU 22 acquires the steering torque the vehicle speed V, the first to fourth electric signals S1 to S4, and the actual current values Im at specified sampling periods as a state variable indicative of a traveling state or a steering state of the vehicle. The MPU 22 then generates a motor control signal based on the acquired state variable.

More specifically, the MPU 22 calculates a basic component of the target assist torque to be generated by the motor 12 based on the steering torque r and the vehicle speed V.

The MPU 22 calculates the rotation angle θ of the motor 12 based on the first to fourth electric signals S1 to S4, and also calculates a steering angle (a rotation angle of a steering wheel) based on the calculated rotation angle θ. The MPU 22 calculates various compensation components for the basic component of the target assist torque based on the calculated steering angle. The compensation components include a steering return component used to return the steering wheel to a neutral position. The MPU 22 calculates a current command value corresponding to a value resulting from summation of the basic component of the target assist torque and the various compensation components. The MPU 22 then performs current feedback control to allow the actual current value Ing of the motor 12 to follow the current command value, thus generating a motor control signal. The motor control signal specifies an on duty of each of the switching elements in the driving circuit 21.

A current corresponding to the motor control signal is supplied to the motor 12 through the driving circuit 21 so that the motor 12 generates a torque (turning force) corresponding to the target assist torque. The torque of the motor 12 is applied to a steering mechanism (for example, a steering shaft) in the vehicle via a speed reducing mechanism not depicted in the drawings, as an assist force that assists the driver's steering.

The MPU 22 also controls turn-on and turn-off of the power relay 36. For example, the MPU 22 keeps the power relay 36 in an on state for a needed period when the power switch 33 in the on state is turned off. Thus, even after the power switch 33 is turned off, the MPU 22 can write certain information to a storage apparatus (not depicted in the drawings) in the MPU 22 or constantly monitor detection results from the sensors supplied with power. When the power supply from the DC power supply 31 becomes unnecessary, the MPU 22 can power down itself by turning off the power relay 36.

Now, the rotation angle sensor will be described in detail. The rotation angle sensor 13 has a bias magnet 41 and a magnetic sensor 42.

The bias magnet 41 is a cylindrical bipolar magnet magnetized to have N poles and S poles arranged in a radial direction, and is fixed to an end of the rotating shaft 12a of the motor 12. As the magnetic sensor 42, for example, an MR sensor (magnetoresistive sensor) is adopted. The magnetic sensor 42 faces the bias magnet 41 in a direction along an axis of the rotating shaft 12a. A bias magnetic field emitted from the bias magnet 41 and traveling in a direction from the N pole toward the S pole is applied to the magnetic sensor 42. The bias magnet 41 rotates integrally with the rotating shaft 12a, and thus, the direction of the bias magnetic field applied to the magnetic sensor 42 varies in accordance with the rotation angle θ of the rotating shaft 12a.

The magnetic sensor 42 generates the first to fourth electric signals S1 to S4 in accordance with the direction of the bias magnetic field applied by the bias magnet 41. The magnetic sensor 42 includes a first detector 42a and a second detector 42b. The first detector 42a and the second detector 42b each have a Wheatstone bridge circuit including four magnetoresistive elements. The MPU 22 is supplied with midpoint potentials of two half bridges included in the Wheatstone bridge in the first detector 42a, as the first electric signal S1 and the second electric signal S2. The MPU 22 is supplied with midpoint potentials of two half bridges included in the Wheatstone bridge circuit in the second detector 42b, as the third electric signal S3 and the fourth electric signal 84.

When the directions of the bias magnetic fields applied to the magnetoresistive elements change in conjunction with rotation of the bias magnet 41, resistance values of the magnetoresistive elements correspondingly change. The changes in the resistance values of the magnetoresistive elements lead to changes in the first to fourth electric signals S1 to S4. That is, the first to fourth electric signals S1 to S4 change in accordance with the rotation angle θ of the rotating shaft 12a.

In the present embodiment, the first to fourth electric signals S1 to S4 are changed as represented by Expressions (1) to (4) by adjusting the arrangement (reference direction) of the magnetoresistive elements as needed.

$$S1 = A \sin \theta \tag{1}$$

$$S2 = -A \sin \theta \tag{2}$$

$$S3 = A \cos \theta \tag{3}$$

$$S4 = -A \cos \theta \tag{4}$$

The electric signal S1 is a sine signal (first sine signal) with an amplitude A that varies like a sine wave with respect to the rotation angle θ of the rotating shaft 12a. The second electric signal S2 is a sine signal (second sine signal) with the amplitude A and a phase shifted by 180° from a phase of the first electric signal S1. The third electric signal S3 is a cosine signal (first cosine signal) with the amplitude A and a phase lagged by 90° behind the phase of the first electric signal S1. The fourth electric signal S4 is a cosine signal (second cosine signal) with the amplitude A and a phase shifted by 180° from the phase of the third electric signal S3. The first to fourth electric signals are signals for which one period is a period of time during which the rotating shaft 12a (bias magnet 41) rotates through an angle corresponding to one magnetic pole pair (in this case, 360°).

The MPU 22 acquires the first and second electric signals S1 and S2 and the third and fourth electric signals S3 and S4 at specified sampling periods. As represented by Expressions (5) and (6), the MPU 22 calculates a difference (first difference value) between the first electric signal S1 and the second electric signal S2 and a difference (second difference value) between the third electric signal S3 and the fourth electric signal S4. Consequently, a signal is obtained which has an amplitude 2 A that is double the amplitude of the first to fourth electric signals S1 to S4. As represented by Expression (7), the MPU 22 calculates an arctangent value based on the first and second difference values to determine the rotation angle θ of the rotating shaft 12a.

$$\text{First difference value(sine component)} = S1 - S2 = 2A \sin \theta \tag{5}$$

$$\text{Second difference value(cosine component)} = S3 - S4 = 2A \cos \theta \tag{6}$$

$$\theta = \text{Arctan}(2A \sin \theta / 2A \cos \theta) \tag{7}$$

However, the MPU 22 can detect the rotation angle θ of the rotating shaft 12a by calculating an arctangent value based on the first electric signal S1 and the third electric signal S3 as represented by Expression (8) or calculating an arctangent value based on the second electric signal S2 and the fourth electric signal S4 as represented by Expression (8).

$$\theta = \text{Arctan}(S1/S3) \tag{8}$$

$$\text{Arctan}(S2/S4) \tag{9}$$

The rotation angle θ calculated based on the first to fourth electric signals S1 to S4 is a relative angle. In contrast, the steering angle used for steering return control and the like is an absolute angle. Thus, the MPU 22 calculates the steering angle in absolute value, for example, as follows.

The MPU 22 calculates the steering angle based on the rotation angle θ (electrical angle) of the motor 12 as represented by Expression (10). In this case, in a precondition, a torque of the motor 12 is applied to the steering shaft via a speed reducing mechanism not depicted in the drawings.

$$\text{Steering angle(absolute angle)} = (\theta + N \times 360°)/Gr \quad (10)$$

Symbol N represents the number of rotations (the number of periods) when one rotation is defined as one period of the rotation angle θ, that is, a variation in electrical angle from 0° to 360°. The number of rotations N is acquired through the rotation detector 23. The speed reducing mechanism (not depicted in the drawings) that reduces the speed of rotation transmitted from the motor 12 has a gear ratio (speed reduction ratio) Gr. Information indicative of the gear ratio Gr is stored in the storage apparatus in the MPU 22, which is not depicted in the drawings. Thus, the rotation angle sensor 13, the rotation detector 23, and the MPU 22 function as a rotation angle detection apparatus that detects the rotation angle θ of the motor 12 (to be exact, the rotating shaft 12a).

When the power switch 33 is turned off, the MPU 22 turns on the power relay 36 to continue supplying power to the MPU 22, The MPU 22 then stores, in the storage apparatus not depicted in the drawings, the rotation angle θ of the motor 12 obtained immediately before the power switch 33 is turned off and the number of rotations N acquired through the rotation detector 23 immediately before the power switch 33 is turned off. This action is taken to allow the accurate steering angle to be calculated when the power switch 33 is turned on again, After storing the rotation angle θ and the number of rotations N in the storage apparatus, the MPU 22 turns off the power relay 36 to power down the MPU 22.

However, the steering wheel may be operated for some reason while the power switch 33 is off. In this case, the rotation angle θ and the number of rotations N of the motor 12 stored in the storage apparatus immediately before stoppage of the power supply to the MPU 22 may become different from the actual rotation angle θ and the actual number of rotations N, precluding the accurate steering angle from being obtained when the power switch 33 is turned on again, Thus, at least the number of rotations N of the motor 12 (to be exact, the rotating shaft 12a) is preferably monitored even while the power switch 33 is off.

Accordingly, in the present embodiment, the rotation angle sensor 13 and the rotation detector 23 continue to be supplied with power so that the number of rotations N of the motor 12 is continuously counted even while the power switch 33 is off. Furthermore, to keep the detection of the number of rotations N reliable, the rotation detector 23 needs to have a function to detect an abnormality in the rotation detector 23 (self-diagnosis function). This is because, while the power switch 33 is off, the MPU 22 is powered down in order to suppress drain of the DC power supply 31. A specific configuration of the rotation detector 23 is as described below.

The rotation detector 23 has a first arithmetic circuit 51, a second arithmetic circuit 52, and an abnormality determination circuit 53. The first arithmetic circuit 51, the second arithmetic circuit 52, and the abnormality determination circuit 53 may be integrated together into a single IC chip.

The first arithmetic circuit 51 acquires, at specified sampling periods, the first electric signal S1 and the third electric signal S3 generated by the rotation angle sensor 13 to calculate the rotating direction D1 and the number of rotations N1 of the motor 12 (rotating shaft 12a) based on the acquired first electric signal S1 and third electric signal S3.

First, a method for calculating the rotating direction D1 will be described. The first arithmetic circuit 51 plots a coordinate Q1 (cos θ, sin θ) that is a set of the first electric signal S1 (first sine signal) and the third electric signal S3 (first cosine signal) on an orthogonal coordinate system of cos θ and sin θ. The first arithmetic circuit 51 detects the rotating direction D1 of the motor 12 based on a transition of a quadrant where the plotted coordinate Q1 is located. The first arithmetic circuit 51 determines the quadrant where the plotted coordinate Q1 is located based on whether the values of sin θ and cos θ are positive or negative as represented by Expressions (11) to (14).

$$\text{First quadrant: } \cos\theta \geq 0, \sin\theta \geq 0 \quad (11)$$

$$\text{Second quadrant: } \cos\theta < 0, \sin\theta \geq 0 \quad (12)$$

$$\text{Third quadrant: } \cos\theta < 0, \sin\theta < 0 \quad (13)$$

$$\text{Fourth quadrant: } \cos\theta \geq 0, \sin\theta < 0 \quad (14)$$

Upon determining that the coordinate Q1 has transitioned, for example, from a first quadrant to a second quadrant, based on a change in a combination of positivity and negativity of the sin θ and cos θ values, the first arithmetic circuit 51 determines that the rotating direction D1 of the motor 12 is a forward direction. This also applies to cases where the coordinate Q1 has transitioned from the second quadrant to a third quadrant, from the third quadrant to a fourth quadrant, and from the fourth quadrant to the first quadrant. Upon determining that the coordinate Q1 has transitioned, for example, from the first quadrant to the fourth quadrant, based on a change in the combination of positivity and negativity of the sin θ and cos θ values, the first arithmetic circuit S1 determines that the rotating direction D1 of the motor 12 is a backward direction. This also applies to cases where the coordinate Q1 has transitioned from the fourth quadrant to the third quadrant, from the third quadrant to the second quadrant, and from the second quadrant to the first quadrant. As described above, in the present embodiment, the rotating direction D1 of the motor 12 is the same as the direction in which the coordinate Q1 transitions from quadrant to quadrant (quadrant transition direction).

Now, a method for calculating the number of rotations N1 will be described. The first arithmetic circuit 51 has a counter. The first arithmetic circuit 51 increments or decrements a count value by a given value (a positive natural number, for example, 1 or 2) each time the quadrant where the coordinate Q1 is located is switched. In the present embodiment, when the rotating direction D1 of the motor 12 is the forward direction, the count value is incremented by one each time the coordinate transitions one quadrant. When the rotating direction D1 of the motor 12 is the backward direction, the count value is decremented by one each time the coordinate transitions one quadrant.

The first arithmetic circuit 51 detects the number of rotations N1 of the motor 12 based on the count value in the first arithmetic circuit 51. For example, when the count value is +1, the first arithmetic circuit 51 determines that the motor 12 has made a quarter forward rotation (rotated in the forward direction for a quarter period). Similarly, when the count value is +2, +3, or +4, the first arithmetic circuit S1 determines that the motor 12 has made a half forward rotation, a three-quarter forward rotation, or one forward rotation, respectively. When the count value is −1, the first arithmetic circuit 51 determines that the motor 12 has made a quarter backward rotation (rotated in the backward direction for a quarter period). Similarly, when the count value is −2, −3, or −4, the first arithmetic circuit 51 determines that the motor 12 has made a half backward rotation, a three-quarter backward rotation, or one backward rotation, respectively. When the count value is zero, the first arithmetic circuit 51 determines that the motor 12 is making no rotation.

The second arithmetic circuit 52 is configured similarly to the first arithmetic circuit 51. That is, the second arithmetic circuit 52 detects a rotating direction D2 of the motor 12 based on a transition of the quadrant where a coordinate Q2 (cos θ, sin θ) that is a set of the second electric signal S2 (second sine signal) and the fourth electric signal S4 (second cosine signal) is located. The second arithmetic circuit 52 increments or decrements the count value by a given value (a positive natural number, for example, 1 or 2) each time the quadrant where the coordinate Q2 is located is switched. The second arithmetic circuit 52 detects the number of rotations N2 of the motor 12 based on the count value in the second arithmetic circuit 52.

The abnormality determination circuit 53 acquires the rotating direction D1 calculated by the first arithmetic circuit 51 and the rotating direction D2 calculated by the second arithmetic circuit 52. The abnormality determination circuit 53 then determines whether an abnormality has occurred in at least one of the first and second arithmetic circuits 51 and 52 based on the acquired rotating directions D1 and D2. The rotating directions D1 and D2 may contain information indicating that the coordinates Q1 and Q2, respectively, have not transitioned. A specific abnormality determination method is as described below.

First, preconditions for the abnormality determination method will be described below. The first arithmetic circuit 51 and the second arithmetic circuit 52 have the same configuration. However, the first arithmetic circuit 51 and the second arithmetic circuit 52 involve a variation factor associated with hardware characteristics representing individual differences. Consequently, in an orthogonal coordinate system of cos θ and sin θ, a difference δ occurs between the coordinate Q1 plotted by the first arithmetic circuit 51 and the coordinate Q2 plotted by the second arithmetic circuit 52, as depicted in FIG. 2A. In the preconditions, the difference δ falls within the range of one quadrant (90°) in the orthogonal coordinate system.

Occurrence of the difference δ is not abnormal. Thus, determining the presence of an abnormality based on the difference δ needs to be avoided. Therefore, in the present embodiment, in order to accept the difference δ between the two coordinates Q1 and Q2 resulting from the variation factor associated with the hardware characteristics of the first arithmetic circuit 51 and the second arithmetic circuit 52, a shift of up to one quadrant between the coordinates Q1 and Q2 is determined to fall within a normal range. That is, when the absolute value of the difference between the count value in the first arithmetic circuit 51 (the number of rotations N1) and the count value in the second arithmetic circuit 52 (the number of rotations N2) is smaller than or equal to a given value that is an increment or a decrement in the counter (in the present embodiment, when the absolute value is 1), the first arithmetic circuit 51 and the second arithmetic circuit 52 are each determined to be normal. In contrast, when the two coordinates Q1 and Q2 are shifted from each other by two quadrants, the presence of an abnormality is determined. That is, when the absolute value of the difference between the two count values (the numbers of rotations N1 and N2) is larger than the given value that is an increment or a decrement in the counter (in the present embodiment, when the absolute value is 2), at least one of the first and second arithmetic circuits 51 and 52 is determined to be abnormal.

Under these preconditions, in the present embodiment, the state of a change in the two coordinates Q1 and Q2 is classified into the following six types. The abnormality determination circuit 53 determines whether the first arithmetic circuit 51 and the second arithmetic circuit 52 are each abnormal based on these types.

In the following description of the types, each of the two coordinates Q1 and Q2 is assumed to initially lie in the first quadrant of the orthogonal coordinate system. In the following description, movement of the coordinate refers to switching of the quadrant where the coordinate Q1 or Q2 is located. This is because movement of the two coordinates Q1 and Q2 is detected (counted) in units of quadrants. Movement of the two coordinates Q1 and Q2 within the same quadrant is determined to have made no movement because the movement involves no switching of the quadrants.

Type 1: the two coordinates Q1 and Q2 simultaneously move in opposite directions as depicted in FIG. 2A, For example, the coordinate Q1 moves from the first quadrant to the second quadrant, and at the same time, the coordinate Q2 moves from the first quadrant to the fourth quadrant. At this time, the abnormality determination circuit 53 immediately determines the presence of an abnormality. This is because the two coordinates Q1 and Q2 are separated from each other by two quadrants.

Figure 2B:
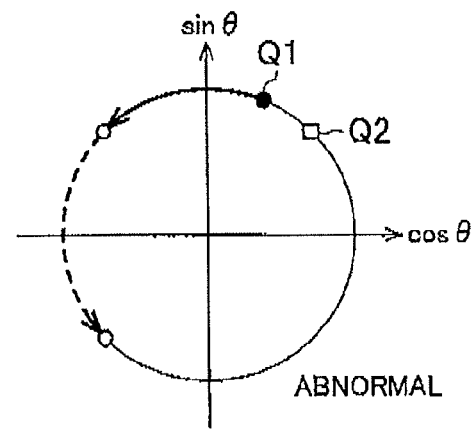
FIG. 2B shows Lissajous diagram depicting a type of changes in two coordinates that are each a set of sin $\theta$ and cos $\theta$.

Type 2: only a first one of the two coordinates Q1 and Q2 moves in the forward direction or the backward direction, and then, only the first coordinate, having moved, moves further in the same direction as depicted in FIG. 2B. For example, the coordinate Q1 transitions from the first quadrant to the second quadrant, and then, only the coordinate Q1, having transitioned, transitions further from the second quadrant to the third quadrant. At this time, the abnormality determination circuit 53 determines the presence of an abnormality. This is because the two coordinates Q1 and Q2 are separated from each other by two quadrants.

Figure 2C:
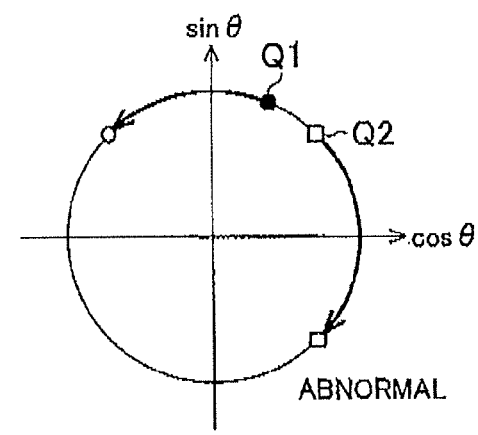
FIG. 2C shows Lissajous diagram depicting a type of changes in two coordinates that are each a set of sin $\theta$ and cos $\theta$.

Type 3: only a first one of the two coordinates Q1 and Q2 moves in the forward direction or the backward direction, and then, only a second coordinate moves in a direction opposite to the direction in which the first coordinate has moved, as depicted in FIG. 2C. For example, only the coordinate Q1 transitions from the first quadrant to the second quadrant, and then, only the coordinate Q2 transitions from the first quadrant to the fourth quadrant. At this time, the abnormality determination circuit 53 determines the presence of an abnormality. This is because the two coordinates Q1 and Q2 are separated from each other by two quadrants.

Figure 2D:
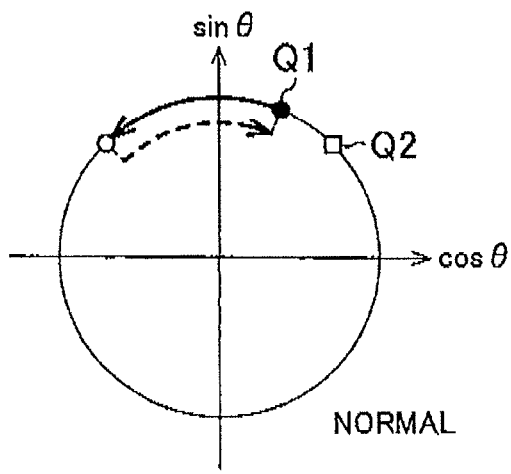
FIG. 2D shows Lissajous diagram depicting a type of changes in two coordinates that are each a set of sin $\theta$ and cos $\theta$.

Type 4: only a first one of the two coordinates Q1 and Q2 moves in the forward direction or the backward direction, and then, only the first coordinate, having moved, moves further in a direction opposite to the direction in which the first coordinate has moved, as depicted in FIG. 2D. For example, only the coordinate Q1 transitions from the first quadrant to the second quadrant, and then, only the coordinate Q1 transitions from the second quadrant to the first quadrant. At this time, the abnormality determination circuit 53 determines the absence of abnormality. This is because one of the coordinates having moved returns to the quadrant where the coordinate was located, so the difference between the quadrants where the two coordinates Q1 and Q2 are located does not increase.

Figure 2E:
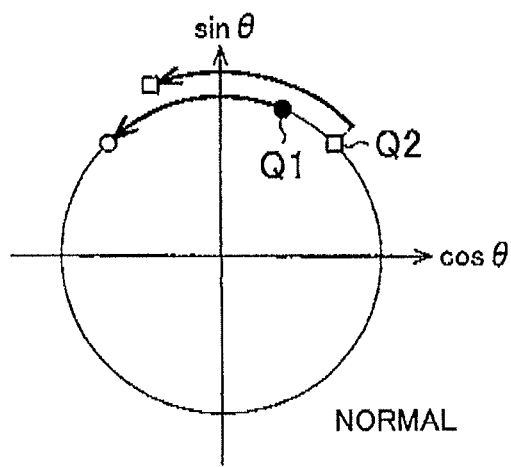
FIG. 2E shows Lissajous diagram depicting a type of changes in two coordinates that are each a set of sin $\theta$ and cos $\theta$.

Type 5: only a first one of the two coordinates Q1 and Q2 moves in the forward direction or the backward direction, and then, only a second coordinate moves in the same direction as the direction in which the first coordinate has moved, as depicted in FIG. 2E. For example, only the coordinate Q1 transitions from the first quadrant to the second quadrant, and then, only the coordinate Q2 transitions from the first quadrant to the second quadrant. At this time, the abnormality determination circuit 53 determines the absence of abnormality. This is because the relative difference between the quadrants where the two coordinates Q1 and Q2 are located does not increase.

Figure 2F:
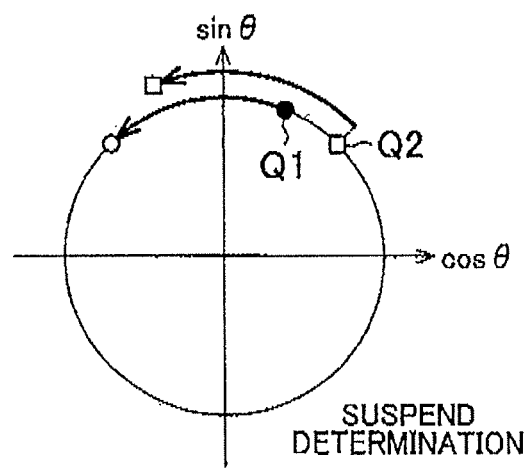
FIG. 2F shows Lissajous diagram depicting a type of changes in two coordinates that are each a set of sin $\theta$ and cos $\theta$.

Type 6: the two coordinates Q1 and Q2 simultaneously move in the same direction as depicted in FIG. 2F, For example, the two coordinates Q1 and Q2 simultaneously move from the first quadrant to the second quadrant. At this time, the abnormality determination circuit 53 suspends the determination of whether each of the arithmetic circuits is normal or abnormal until the next sampling time. This is because the determination result may vary depending on a relation with the last movement and the next movement of the two coordinates Q1 and Q2. For example, if the abnormality determination circuit 53 has determined that the coordinate Q1 moved in the forward direction whereas the coordinate Q2 made no movement (that is, the difference in quadrant is one quadrant), even when the two coordinates Q1 and Q2 simultaneously move in the same direction, the difference between the quadrants where the two coordinates Q1 and Q2 are located is one quadrant and remains unchanged. That is, until the next movement of the two coordinates Q1 and Q2 is checked, it is impossible to determine whether the shift between the two coordinates Q1 and Q2 is equal to two quadrants or a shift of one quadrant is maintained between the coordinates Q1 and Q2 or the coordinates Q1 and Q2 lie in the same quadrant.

As described above, whether the relative positional relationship between the two coordinates Q1 and Q2 involves a shift of two quadrants is determined based on the quadrant transition direction of each of the two coordinates Q1 and Q2 in the orthogonal coordinate system (the direction in which the coordinate transitions from quadrant to quadrant). When the two coordinates Q1 and Q2 are determined to be in a positional relationship in which the coordinates Q1 and Q2 are relatively shifted by two quadrants, at least one of the first and second arithmetic circuits 51 and 52 is determined to be abnormal.

Actually, Types 1 to 6 appear in a mixed manner over time. The following are examples of combinations of the determination result and the rotating directions D1 and D2 of the motor 12 (rotating shaft 12a), that is, the transition directions of the two coordinates Q1 and Q2 in the orthogonal coordinate system.

For example, when, at a sampling time t1, the coordinate Q1 is determined to have moved in the forward direction, whereas the coordinate Q2 is determined to have made no movement as depicted in a graph A in FIG. 3, the two coordinates Q1 and Q2 are relatively shifted by one quadrant (the difference in quadrant=+1). However, the presence of an abnormality cannot be determined at this point of time. In this state, any of Types 2 to 5 is possible.

Subsequently, at a sampling time t2, each of the two coordinates Q1 and Q2 is determined to have moved in the forward direction. At this time, the relative positional relationship between the two coordinates Q1 and Q2 is maintained such that the coordinates Q1 and Q2 are shifted from each other by one quadrant (the difference in quadrant=+1). This state corresponds to Type 6.

Then, at a sampling time t3, each of the two coordinates is determined to have moved in the backward direction. At this time, the relative positional relationship between the two coordinates Q1 and Q2 is maintained such that the coordinates Q1 and Q2 are shifted from each other by one quadrant (the difference in quadrant=+1), This state also corresponds to Type 6.

Subsequently, the state of Type 6 continues, and at a sampling time tn, the coordinate Q1 is determined to have moved in the backward direction, whereas the coordinate Q2 is determined to have made no movement. At this time, the relative positional relationship between the two coordinates Q1 and Q2 is such that the coordinates Q1 and Q2 are shifted from each other by two quadrants (the difference in quadrant=+2). This state corresponds to Type 2 and is thus determined to be abnormal.

As depicted in graphs B to E in FIG. 3, whether each of the arithmetic circuits is normal or abnormal depends on the state at the sampling time tn.

As depicted in the graph B in FIG. 3, when, at the sampling time tn, the coordinate Q1 is determined to have moved in the backward direction, whereas the coordinate Q2 is determined to have made no movement, the coordinates Q1 and Q2 are located in the same quadrant (the difference in quadrant=0). This state corresponds to Type 4 and is determined to be normal.

As depicted in the graph C in FIG. 3, when, at the sampling time tn, the coordinate Q1 is determined to have made no movement, whereas the coordinate Q2 is determined to have moved in the backward direction, the relative positional relationship between the coordinates Q1 and Q2 is such that the coordinates Q1 and Q2 are shifted from each other by two quadrants (the difference in quadrant=+2). This state corresponds to Type 3 and is thus determined to be abnormal.

As depicted in the graph D in FIG. 3, when, at the sampling time tn, the coordinate Q1 is determined to have made no movement, whereas the coordinate Q2 is determined to have moved in the forward direction, the coordinates Q1 and Q2 are located in the same quadrant (the difference in quadrant=0). This state corresponds to Type 5 and is thus determined to be normal.

As depicted in the graph E in FIG. 3, when, at the sampling time tn, the coordinate Q1 is determined to have moved in the forward direction, whereas the coordinate Q2 is determined to have moved in the forward direction, the relative positional relationship between the coordinates Q1 and Q2 is such that the coordinates Q1 and Q2 are shifted from each other by two quadrants (the difference in quadrant=+2). This state corresponds to Type 1 and is thus determined to be abnormal. When the state of Type 1 occurs, the presence of an abnormality can be immediately determined.

As described above, whether the relative positional relationship between the two coordinates Q1 and Q2 is such that the coordinates Q1 and Q2 are shifted from each other by two quadrants can be exhaustively determined based on the rotating direction D1 (the quadrant transition direction of the coordinate Q1) that is a calculation result produced by the first arithmetic circuit 51 and the rotating direction D2 (the quadrant transition direction of the coordinate Q2) that is a calculation result produced by the second arithmetic circuit 57.

Only one of the first and second arithmetic circuits 51 and 52 may be provided. Now, a configuration in which only the first arithmetic circuit 51 is provided will be discussed as a comparative example.

While the motor 12 is rotating normally, the coordinate Q1 plotted on the orthogonal coordinate system transitions from quadrant to quadrant. That is, it is impossible that the coordinate Q1 suddenly transitions two quadrant away (transitions to the quadrant located diagonally with respect to the current quadrant). For example, when the motor 12 rotates forward, the coordinate Q1 located in the first quadrant does not transition directly to the third quadrant rather than to the second quadrant. Thus, the coordinate Q1 transitioning two quadrants away can be determined to be abnormal.

However, the expected abnormality is not necessarily limited to the coordinate Q1 transitioning two quadrants away. An abnormality is present in which the coordinate Q1 apparently transitions one quadrant as in the case of the normal state. In this case, determining whether each of the arithmetic circuits is normal or abnormal is difficult.

Figure 4:
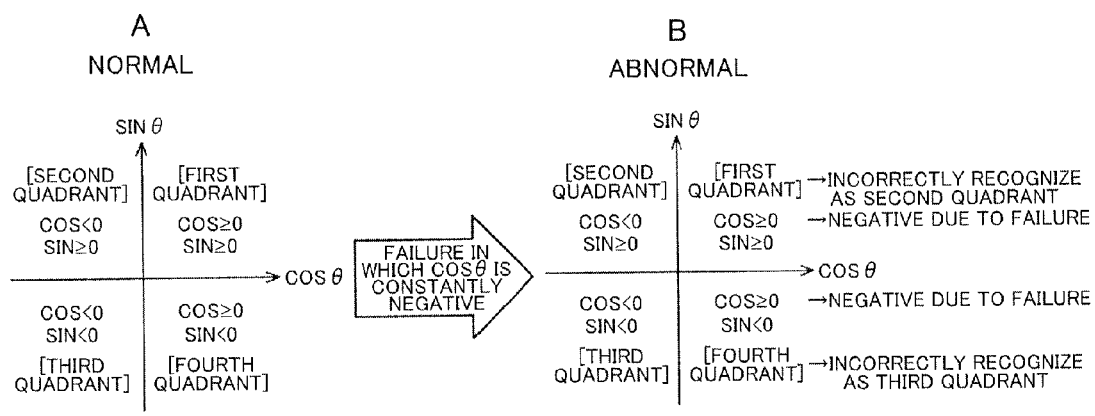
FIG. 4 shows a graph A depicting an orthogonal coordinate system of sin $\theta$ and cos $\theta$ in a normal state, and a graph B depicting an orthogonal coordinate system of sin $\theta$ and cos $\theta$ in a state where an abnormality has occurred in which a value of cos $\theta$ is constantly negative.

For example, when an abnormality occurs in which the value of cos θ is constantly negative as illustrated in graphs A and B in FIG. 4, the first arithmetic circuit 51 may incorrectly recognize that the coordinate Q1 is located in the second quadrant though the coordinate Q1 is actually located in the first quadrant. The first arithmetic circuit 51 may incorrectly recognize that the coordinate Q1 is located in the third quadrant though the coordinate Q1 is actually located in the fourth quadrant.

In this case, only two adjacent quadrants of the originally existing four quadrants are actually recognized by the first arithmetic circuit S1. Thus, although the coordinate Q1 is actually moving in the forward direction (counterclockwise in the drawings), the coordinate Q1 may be incorrectly recognized to be moving in the backward direction (clockwise in the drawings). The coordinate Q1 may be incorrectly recognized to be moving in the forward direction though the coordinate Q1 is actually moving in the backward direction.

Specifically, when the coordinate Q1 has actually moved from the fourth quadrant to the first quadrant, the first arithmetic circuit 51 incorrectly recognizes that the coordinate Q1 has moved from the third quadrant to the second quadrant. At this time, the first arithmetic circuit S1 incorrectly recognizes that the moving direction of the coordinate Q1 is the backward direction instead of the actual forward direction. When the coordinate Q1 has actually moved from the first quadrant to the fourth quadrant, the first arithmetic circuit 51 incorrectly recognizes that the coordinate Q1 has moved from the second quadrant to the third quadrant. At this time, the first arithmetic circuit 51 incorrectly recognizes that the moving direction of the coordinate Q1 is the forward direction instead of the actual backward direction.

In the present embodiment, the first arithmetic circuit 51 and the second arithmetic circuit 52 are provided to allow comparison of the two rotating directions D1 and D2 calculated by the first arithmetic circuit 51 and the second arithmetic circuit 52, respectively. This enables detection of an abnormality in which the coordinate Q apparently moves one quadrant as in the case of the normal state. This will be specifically described below.

In this example, the abnormality illustrated in the graph B in FIG. 4 occurs in the first arithmetic circuit 51, However, in the precondition, the second arithmetic circuit 52 is normal, and the normal moving direction of each of the two coordinates Q1 and Q2 is the forward direction (counterclockwise in the drawings).

As described above, when the coordinate Q1 actually moves from the fourth quadrant to the first quadrant, the first arithmetic circuit 51 incorrectly recognizes that the coordinate Q1 has moved from the third quadrant to the second quadrant. That is, the first arithmetic circuit 51 incorrectly recognizes that the moving direction of the coordinate Q1 is the backward direction (clockwise in the drawings).

In contrast, the second arithmetic circuit 52 correctly recognizes that the coordinate Q2 has moved from the fourth quadrant to the first quadrant. That is, at this time, the second arithmetic circuit 52 correctly recognizes that the moving direction of the coordinate Q2 is the forward direction (clockwise in the drawings).

When the abnormality determination circuit 53 determines at a particular sampling time that the coordinate Q1 has moved in the backward direction, whereas the coordinate Q2 has moved in the forward direction, as described above, the relative positional relationship between the two coordinates Q1 and Q2 is such that the coordinates Q1 and Q2 are shifted from each other by two quadrants. That is, simultaneous detection of these states corresponds to the above-described Type 1 and can be determined to indicate abnormality. Detection of the states at different times corresponds to the above-described Type 3 and can be determined to indicate abnormality.

Now, operations of the MPU 22 in conjunction with turn-on and turn-off of the power switch 33 will be described.

When the power switch 33 in the on state is turned off, the MPU 22 generates a reset signal for the first arithmetic circuit 51 and the second arithmetic circuit 52. The first arithmetic circuit 51 and the second arithmetic circuit 52 reset the respective count values to zero based on the reset signal generated by the MPU 22. The resetting is performed to allow counting of the numbers of rotations N1 and N2 during a period from turn-off of the power switch 33 until the next turn-on of the power switch 33. The MPU 22 turns off the power relay 36 after generating the reset signal.

When the power switch 33 in the off state is turned on, the MPU 22 generates an information request signal that requests information from the first arithmetic circuit 51, the second arithmetic circuit 52, and the abnormality determination circuit 53, Based on the information request signal generated by the MPU 22, the first arithmetic circuit 51, the second arithmetic circuit 52, and the abnormality determination circuit 53 provide the number of rotations N1, the number of rotations N2, and the determination result, respectively, to the MPU 22 as the requested information.

When the determination result acquired from the abnormality determination circuit 53 is indicative of abnormality, the MPU 22 calculates the steering angle (absolute angle) using the number of rotations N1 acquired from the first arithmetic circuit 51 or the number of rotations N2 acquired from the second arithmetic circuit 52, Determination of the number of rotations N1 or N2 (count value) made while the power switch 33 is off allows determination of the rotation angle θ from the last turn-off of the power switch 33 until the current turn-on of die power switch 33. When the power switch 33 is turned on again, the MPU 22 adds the rotation angle (change angle) obtained while the power switch 33 is off to the rotation angle θ stored at the time of the last turn-off of the power switch 33 to detect the current rotation angle θ, The MPU 22 uses the current rotation angle θ to calculate the steering angle (absolute angle), and uses the steering angle to perform compensation control such as steering return control.

In contrast, when the determination result acquired from the abnormality determination circuit 53 is indicative of abnormality, the MPU 22 does not use the number of rotations N1 acquired from the first arithmetic circuit 51 or the number of rotations N2 acquired from the second arithmetic, circuit 52. At this time, the MPU 22 may disable a control function such as steering return control which utilizes the steering angle (absolute angle).

When the determination result acquired from the abnormality determination circuit 53 indicates that the presence of an abnormality has been undetermined, the MPU 22 uses the number of rotations N1 acquired from the first arithmetic circuit 51 or the number of rotations N2 acquired from the second arithmetic circuit 52.

The present embodiment allows the following effects to be exerted.

(1) The first arithmetic circuit 51 calculates the rotating direction D1 of the rotating shaft 12a and the number of rotations N1 of the rotating shaft 12a based on a change in the combination of positivity and negativity of the first electric signal S1 (first sine signal) and the third electric signal S3 (first cosine signal). The second arithmetic circuit 52 calculates the rotating direction D2 of the rotating shaft 12a and the number of rotations N2 of the rotating shaft 12a based on a change in the combination of positivity and negativity of the second electric signal S2 (second sine signal) and the fourth electric signal S4 (second cosine signal). The abnormality determination circuit 53 can appropriately determine whether each of the first and second arithmetic circuits 51 and 52 is abnormal based on the two rotating directions D1 and D2 calculated by the first and second arithmetic circuits 51 and 52, respectively. For example, a normally impossible change in the two rotating directions D1 and D2 means the occurrence of abnormality in at least one of the first and second arithmetic circuits 51 and 52.

(2) Due to the individual difference between the first arithmetic circuit 51 and the second arithmetic circuit 52, for example, a shift of one quadrant or less is present between the coordinate Q1, which is a set of the first electric signal S1 and the third electric signal S3, and the coordinate Q2, which is a set of the second electric signal S2 and the fourth electric signal S4, The two rotating directions D1 and D2 correspond to the quadrant transition directions of the two coordinates Q1 and Q2 (the directions in which the coordinates Q1 and Q2 transition from quadrant to quadrant). Under these preconditions, the abnormality determination circuit 53 determines that an abnormality has occurred in at least one of the first and second arithmetic circuits 51 and 52, upon determining, based on the quadrant transition directions of the two coordinates Q1 and Q2, that the difference between the quadrant where the coordinate Q1 is located and the quadrant where the coordinate Q2 is located has reached two quadrants. Since the shift between the two coordinates Q1 and Q2 resulting from the individual difference between the first and second arithmetic circuits 51 and 52 is equal to or less than one quadrant, it is normally impossible that the difference between the quadrant where the coordinate Q1 is located and the quadrant where the coordinate Q2 is located reaches two quadrants. Thus, while accepting the shift between the two coordinates Q1 and Q2 resulting from the individual difference between the first and second arithmetic circuits 51 and 52, the abnormality determination circuit 53 can appropriately determine that an abnormality has occurred in at least one of the first and second arithmetic circuits 51 and 52 when the difference between the quadrant where the coordinate Q1 is located and the quadrant where the coordinate Q2 is located reaches two quadrants.

(3) The rotation angle sensor 13, the MPU 22, and the rotation detector 23 function as a rotation angle detection apparatus that detects the rotation angle θ of the rotating shaft 12a in absolute value. Since the rotation angle calculated based on the first to fourth electric signals S1 to S4 is a relative angle, determination of the number of rotations of the rotating shaft 12a enables the rotation angle θ to be determined in absolute value, Consequently, the rotation detector 23 is suitable for the rotation angle detection apparatus that detects the rotation angle θ of the rotating shaft 12a in absolute value. The rotation detector 23 is also suitable for the EPS 10 that uses the absolute value of the rotation angle θ.

(4) The rotation detector 23 has a function to determine whether the rotation detector 23 is abnormal and is thus suitable as an apparatus that detects the rotation of the rotating shaft 12a of the motor 12 in the EPS 10. This is because the EPS 10 needs to have high reliability.

(5) When the power switch 33 on the vehicle is turned off, the MPU 22 is powered down, while the rotation angle sensor 13 and the rotation detector 23 continue to be supplied with power. In this configuration, even while the power switch 33 on the vehicle is off, the numbers of rotations N1 and N2 of the rotating shaft 12a continue to be detected. Furthermore, even while the power switch 33 is off, the rotation detector 23 continues to determine whether the rotation detector 23 is abnormal. Thus, when the power switch 33 is turned on, the MPU 22 can immediately determine whether or not the numbers of rotations N1 and N2 detected by the rotation detector 23 can be used.

(6) With the shift between the two coordinates Q1 and Q2 resulting from the individual difference between the first and second arithmetic circuits 51 and 52 taken into account, the abnormality determination circuit 53 stores, for the types of combinations of changes in the rotating directions D1 and D2 (the quadrant transition directions of the coordinates Q1 and Q2), Types 1 to 3 that are impossible combinations and Types 4 to 6 that are possible combinations, Based on these types, the abnormality determination circuit 53 can easily determine whether at least one of the first and second arithmetic circuits 51 and 52 is normal or abnormal.

The above-described embodiment may be modified in implementation.

In the present embodiment, when the power switch 33 is turned off, the MPU 22 generates the reset signal for the rotation detector 23 (first and second arithmetic circuits 51 and 52), However, this configuration may be modified as follows. When the power switch 33 is turned off to stop the power supply to the MPU 22, the MPU 22 stores, in the storage apparatus, the rotation angle θ and the number of rotations N of the motor 12 obtained immediately before the stoppage of the power supply. When the power switch 33 is turned on again, the MPU 22 acquires the number of rotations N (N1 and N2) again through the rotation detector 23, The MPU 22 calculates the difference between the number of rotations N obtained when the power switch 33 is turned off and the number of rotations N obtained when the power switch 33 is turned on. Then, the MPU 22 calculates the absolute value of the rotation angle θ and thus the steering angle (absolute angle), taking the calculated difference into account.

In the present embodiment, the MR sensor is used as the rotation angle sensor 13, However, a Hall sensor (Hall IC)

may be used. Any magnetic sensor may be used as long as the magnetic sensor generates two sine signals with different phases and two cosine signals with different phases in association with rotation of the rotating shaft 12*a*.

In the present embodiment, the MPU 22 has the function to calculate the rotation angle θ. However, the rotation detector 23 may have the function to calculate the rotation angle θ (third arithmetic circuit). In this case, the MPU 22 controls driving of the motor 12 by utilizing the rotation angle θ calculated by the third arithmetic circuit of the rotation detector 23.

What is claimed is:

1. A rotation detection apparatus of a power steering system that detects a rotating direction of a rotating shaft and a number of rotations of the rotating shaft based on first and second sine signals and first and second cosine signals generated based on measurements detected by a sensor connected to the rotation detection apparatus, the first and second sine signals corresponding to rotation of the rotating shaft and having phases shifted from each other by 180°, the first and second cosine signals corresponding to rotation of the rotating shaft and having phases shifted from each other by 180°, the rotation detection apparatus comprising:
   a first arithmetic circuit that:
      acquires, from the sensor, the first sine signal and the first cosine signal indicating rotation of the rotating shaft; and
      calculates the rotating direction of the rotating shaft and the number of rotations of the rotating shaft based on a change in a combination of positivity and negativity of values for the first sine signal and the first cosine signal;
   a second arithmetic circuit that:
      acquires, from the sensor, the second sine signal and the second cosine signal indicating rotation of the rotating shaft; and
      calculates the rotating direction of the rotating shaft and the number of rotations of the rotating shaft based on a change in a combination of positivity and negativity of values for the second sine signal and the second cosine signal; and
   an abnormality determination circuit that:
      receives: (i) the calculated rotating direction of the rotating shaft from the first arithmetic circuit, and (ii) the calculated rotating direction of the rotating shaft from the second arithmetic circuit;
      determines that an abnormality has occurred in at least one of the first arithmetic circuit and the second arithmetic circuit based on the rotating direction calculated by the first arithmetic circuit and the rotating direction calculated by the second arithmetic circuit; and
      generates and outputs a signal configured to indicate that the abnormality has been determined in order to perform compensation control in the power steering system.

2. The rotation detection apparatus according to claim 1, wherein:
   the change in the combination of positivity and negativity means that, in an orthogonal coordinate system in which one of the first and second sine signals represents a value on a Y axis and in which the cosine signal with a phase shifted by 90° from the phase of the sine signal represents a value on an X axis, a quadrant is switched to cause the coordinates to transition,
   in a precondition, a shift of one quadrant or less is present between a first coordinate that is a set of the first sine signal and the first cosine signal and a second coordinate that is a set of the second sine signal and the second cosine signal, due to an individual difference between the first arithmetic circuit and the second arithmetic circuit,
   the rotating direction calculated by the first arithmetic circuit corresponds to a quadrant transition direction of the first coordinate, and the rotating direction calculated by the second arithmetic circuit corresponds to a quadrant transition direction of the second coordinate, and
   the abnormality determination circuit determines that at least one of the first and second arithmetic circuits is abnormal, upon determining, based on the quadrant transition direction of the first coordinate and the quadrant transition direction of the second coordinate, that a difference between a quadrant where the first coordinate is located and a quadrant where the second coordinate is located has reached two quadrants.

3. A rotation angle detection apparatus comprising:
   a rotation detection apparatus of a power steering system that detects a rotating direction of a rotating shaft and a number of rotations of the rotating shaft based on first and second sine signals and first and second cosine signals generated based on measurements detected by a sensor connected to the rotation detection apparatus, the first and second sine signals corresponding to rotation of the rotating shaft and having phases shifted from each other by 180°, the first and second cosine signals corresponding to rotation of the rotating shaft and having phases shifted from each other by 180°, the rotation detection apparatus including:
      a first arithmetic circuit that:
         acquires, from the sensor, the first sine signal and the first cosine signal indicating rotation of the rotating shaft; and
         calculates the rotating direction of the rotating shaft and the number of rotations of the rotating shaft based on a change in a combination of positivity and negativity of values for the first sine signal and the first cosine signal;
      a second arithmetic circuit that:
         acquires, from the sensor, the second sine signal and the second cosine signal indicating rotation of the rotating shaft; and
         calculates the rotating direction of the rotating shaft and the number of rotations of the rotating shaft based on a change in a combination of positivity and negativity of values for the second sine signal and the second cosine signal; and
      an abnormality determination circuit that:
         receives: (i) the calculated rotating direction of the rotating shaft from the first arithmetic circuit, and (ii) the calculated rotating direction of the rotating shaft from the second arithmetic circuit;
         determines that an abnormality has occurred in at least one of the first arithmetic circuit and the second arithmetic circuit based on the rotating direction calculated by the first arithmetic circuit and the rotating direction calculated by the second arithmetic circuit; and
         generates and outputs a signal configured to indicate that the abnormality has been determined in order to perform compensation control in the power steering system; and
   a control circuit that calculates a rotation angle of the rotating shaft based on: (i) the first and second sine signals and the first and second cosine signals generated by the sensor, (ii) the number of rotations calculated by the first arithmetic circuit, and (iii) the number of rotations calculated by the second arithmetic circuit.

4. An electric power steering system comprising:

a rotation detection apparatus of a power steering system that detects a rotating direction of a rotating shaft and a number of rotations of the rotating shaft based on first and second sine signals and first and second cosine signals generated based on measurements detected by a sensor connected to the rotation detection apparatus, the first and second sine signals corresponding to rotation of the rotating shaft and having phases shifted from each other by 180°, the first and second cosine signals corresponding to rotation of the rotating shaft and having phases shifted from each other by 180°, the rotation detection apparatus including:

a first arithmetic circuit that:
  acquires, from the sensor, the first sine signal and the first cosine signal indicating rotation of the rotating shaft; and
  calculates the rotating direction of the rotating shaft and the number of rotations of the rotating shaft based on a change in a combination of positivity and negativity of values for the first sine signal and the first cosine signal;

a second arithmetic circuit that:
  acquires, from the sensor, the second sine signal and the second cosine signal indicating rotation of the rotating shaft; and
  calculates the rotating direction of the rotating shaft and the number of rotations of the rotating shaft based on a change in a combination of positivity and negativity of values for the second sine signal and the second cosine signal; and an abnormality determination circuit that:
  receives: (i) the calculated rotating direction of the rotating shaft from the first arithmetic circuit, and (ii) the calculated rotating direction of the rotating shaft from the second arithmetic circuit;
  determines that an abnormality has occurred in at least one of the first arithmetic circuit and the second arithmetic circuit based on the rotating direction calculated by the first arithmetic circuit and the rotating direction calculated by the second arithmetic circuit; and
  generates and outputs a signal configured to indicate that the abnormality has been determined in order to perform compensation control in the power steering system;

a motor having the rotating shaft to exert a steering assist force in a vehicle; and a control circuit that:
  calculates a rotation angle of the rotating shaft based on: (i) the first and second sine signals and the first and second cosine signals generated by the sensor, (ii) the number of rotations calculated by the first arithmetic circuit, and (iii) the number of rotations calculated by the second arithmetic circuit, and
  controls driving of the motor based on a steering torque and the rotation angle.

5. The electric power steering system according to claim 4, wherein when a power switch on the vehicle is turned off, the control circuit is powered down, and the sensor and the rotation detection apparatus continue to be supplied with power.

* * * * *